US011015635B2

(12) United States Patent
Almy et al.

(10) Patent No.: US 11,015,635 B2
(45) Date of Patent: May 25, 2021

(54) THREADED TRUSS FOUNDATIONS AND RELATED SYSTEMS, METHODS, AND MACHINES

(71) Applicant: OJJO, INC., San Rafael, CA (US)

(72) Inventors: Charles Almy, Berkeley, CA (US); Johann Karkheck, Petaluma, CA (US); Tyrus Hudson, Petaluma, CA (US); David Warner, Fairfax, CA (US); Jack West, San Rafael, CA (US); David Mar, Berkeley, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

(21) Appl. No.: 16/416,052

(22) Filed: May 17, 2019

(65) Prior Publication Data

US 2020/0032831 A1 Jan. 30, 2020

Related U.S. Application Data

(60) Provisional application No. 62/702,879, filed on Jul. 24, 2018, provisional application No. 62/718,780, (Continued)

(51) Int. Cl.
*F16B 25/00* (2006.01)
*F16B 19/10* (2006.01)
(Continued)

(52) U.S. Cl.
CPC ...... *F16B 25/0026* (2013.01); *F16B 19/1045* (2013.01); *F16B 25/0084* (2013.01);
(Continued)

(58) Field of Classification Search
CPC .............. F16B 19/1045; F16B 25/0026; F16B 25/0084; F16B 25/0094; F24S 30/425
See application file for complete search history.

(56) References Cited

U.S. PATENT DOCUMENTS

| 108,814 A | * | 11/1870 | Moseley ................. E02D 27/20 405/222 |
| 3,300,988 A | * | 1/1967 | Phares et al. ............. E02D 7/22 405/239 |

(Continued)

FOREIGN PATENT DOCUMENTS

| EP | 0902128 | 3/1999 |
| GB | 2109041 | 5/1983 |

(Continued)

OTHER PUBLICATIONS

Hercules Machine Corporation (HMC), Self-Contained Track Rig (STR) brochure, Dec. 1, 2015.
International Search Report for PCT/US2019/042767 (12 pages).

*Primary Examiner* — Tara Mayo-Pinnock
(74) *Attorney, Agent, or Firm* — Phillip D. Mancini

(57) ABSTRACT

A machine for rotary driving screw anchors into underlying ground and related. The machine has a mast with a rotary driver and a mandrel driver oriented on a common axis. The mandrel driver passes a mandrel through the rotary driver and the screw anchor to allow the mandrel to be actuated ahead of the screw anchor while the rotary driver drives the screw anchor into the ground. Alternatively, the mandrel driver may also drive a hammering drill through the screw anchor to clear a path ahead of it through subsurface rocks.

16 Claims, 17 Drawing Sheets

Related U.S. Application Data filed on Aug. 14, 2018, provisional application No. 62/726,909, filed on Sep. 4, 2018, provisional application No. 62/733,273, filed on Sep. 19, 2018, provisional application No. 62/748,083, filed on Oct. 19, 2018, provisional application No. 62/752,197, filed on Oct. 29, 2018, provisional application No. 62/756,028, filed on Nov. 5, 2018.

(51) Int. Cl.
  *F24S 30/00* (2018.01)
  *F24S 30/425* (2018.01)

(52) U.S. Cl.
  CPC .......... *F16B 25/0094* (2013.01); *F16B 25/00* (2013.01); *F24S 30/425* (2018.05); *F24S 2030/10* (2018.05)

(56) References Cited

U.S. PATENT DOCUMENTS

| | | | | |
|---|---|---|---|---|
| 3,426,538 | A * | 2/1969 | Turzillo | E02D 3/106 |
| | | | | 405/50 |
| 3,464,216 | A * | 9/1969 | Turzillo | E02D 5/36 |
| | | | | 405/239 |
| 3,565,190 | A * | 2/1971 | Ishii | E21B 7/002 |
| | | | | 175/171 |
| 3,604,214 | A * | 9/1971 | Turzillo | E02D 3/106 |
| | | | | 405/241 |
| 3,794,127 | A * | 2/1974 | Davis | E21B 17/03 |
| | | | | 175/58 |
| 3,973,409 | A * | 8/1976 | Asayama | E02D 5/74 |
| | | | | 405/259.5 |
| 4,036,026 | A * | 7/1977 | Asayama | E02D 5/74 |
| | | | | 405/262 |
| 4,371,041 | A * | 2/1983 | Becker et al. | E21B 3/02 |
| | | | | 173/147 |
| 4,436,455 | A * | 3/1984 | Vance | E21B 19/084 |
| | | | | 173/195 |
| 4,441,557 | A | 4/1984 | Zublin | |
| 4,595,059 | A * | 6/1986 | Katagiri et al. | E21B 3/02 |
| | | | | 173/147 |
| 4,697,648 | A | 10/1987 | Brandt | |
| 4,761,098 | A * | 8/1988 | Lipsker | E02D 5/76 |
| | | | | 405/239 |
| 4,907,915 | A | 3/1990 | Nicholson et al. | |
| 5,002,435 | A * | 3/1991 | Dupeuble | E02D 5/385 |
| | | | | 405/233 |
| 5,348,424 | A * | 9/1994 | Tateyama | E02D 3/126 |
| | | | | 405/240 |
| 5,544,978 | A * | 8/1996 | Albers | E02D 7/26 |
| | | | | 173/184 |
| 5,919,005 | A | 7/1999 | Rupiper | |
| 5,934,836 | A | 8/1999 | Rupiper et al. | |
| 6,000,154 | A | 12/1999 | Berard et al. | |
| 6,234,719 | B1 * | 5/2001 | Roynestad | E02D 7/26 |
| | | | | 173/1 |
| 6,641,332 | B1 * | 11/2003 | Alvarado | E02D 5/28 |
| | | | | 175/323 |
| 6,722,821 | B1 | 4/2004 | Perko et al. | |
| 6,942,430 | B1 | 9/2005 | Suver | |
| 7,387,173 | B2 | 6/2008 | Jinnings et al. | |
| 7,621,098 | B2 | 11/2009 | Reinert, Sr. | |
| 7,854,451 | B2 | 12/2010 | Davis, II | |
| 9,002,539 | B2 | 4/2015 | Kaiser | |
| 9,057,169 | B1 | 6/2015 | Perko | |
| 9,279,228 | B1 | 3/2016 | Jinnings | |
| 9,416,512 | B2 * | 8/2016 | Suver | E02D 11/00 |
| 9,458,591 | B1 | 10/2016 | Watson, III et al. | |
| 9,512,589 | B1 | 12/2016 | Van Polen et al. | |
| 2005/0126821 | A1 * | 6/2005 | Davies | E21B 3/02 |
| | | | | 175/20 |
| 2009/0290940 | A1 | 11/2009 | Marin, Sr. | |

FOREIGN PATENT DOCUMENTS

| | | |
|---|---|---|
| JP | 2010037840 | 2/2010 |
| JP | 2010185204 | 8/2010 |
| JP | 2016079619 | 5/2016 |
| KR | 200285602 | 7/2002 |

* cited by examiner

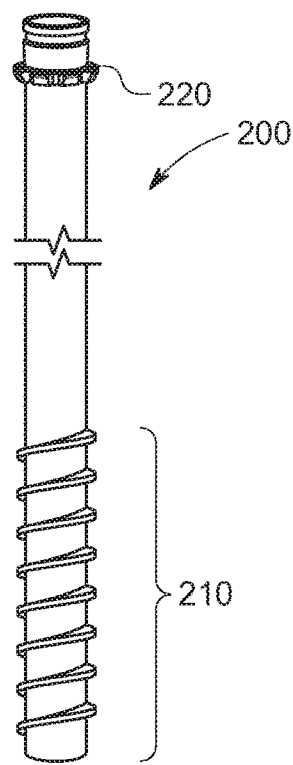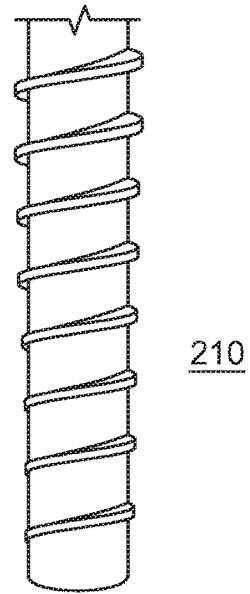
FIG. 4A          FIG. 4B
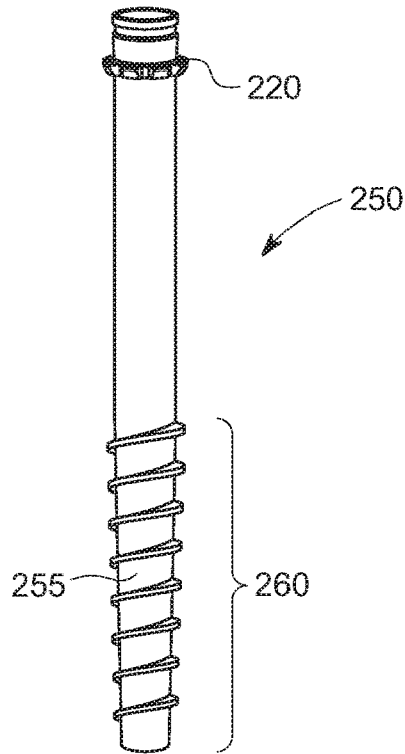
FIG. 4C

THREADED TRUSS FOUNDATIONS AND RELATED SYSTEMS, METHODS, AND MACHINES

CROSS-REFERENCE TO RELATED APPLICATIONS

This claims priority to U.S. provisional patent application No. 62/702,879, filed Jul. 24, 2018, titled "FOUNDATION PIERS FOR AXIAL SOLAR ARRAYS AND RELATED SYSTEMS AND METHODS," No. 62/718,780, filed Aug. 14, 2018, titled "FOUNDATION PIERS FOR AXIAL SOLAR ARRAYS AND RELATED SYSTEMS AND METHODS," No. 62/726,909, filed Sep. 4, 2018, titled "FOUNDATION PIERS FOR AXIAL SOLAR ARRAYS AND RELATED SYSTEMS AND METHODS," No. 62/733,273, filed Sep. 19, 2018, titled "FOUNDATION PIERS FOR AXIAL SOLAR ARRAYS AND RELATED SYSTEMS AND METHODS," No. 62/748,083, filed Oct. 19, 2018, titled "FOUNDATIONS FOR AXIAL SOLAR ARRAY AND RELATED SYSTEMS AND METHODS," No. 62/752,197, filed Oct. 29, 2018, titled SYSTEMS, METHODS AND MACHINES FOR MANUFACTURING A FOUNDATION PILE," and No. 62/756,028, filed Nov. 5, 2018, titled "CLOSED LOOP FEEDBACK CONTROL FOR IMPROVED SOLAR PILE DRIVING AND RELATED SYSTEMS, MACHINES AND CIRCUITS," the disclosures of which are hereby incorporated by reference in its entirety.

BACKGROUND

Utility-scale solar power plants are predominantly configured as fixed-tilt ground mounted arrays or single-axis trackers. Fixed-tilt arrays are arranged in East-West oriented rows of panels tilted South at an angle dictated by the latitude of the array site—the further away from the equator, the steeper the tilt angle. By contrast, single-axis trackers are installed in North-South rows with the solar panels attached to a rotating axis called a torque tube that move the panels from an East-facing orientation to a West-facing orientation throughout the course of each day, following the sun's progression through the sky. For purposes of this disclosure, both fixed-tilt and single-axis trackers are referred to collectively as axial solar arrays.

Excluding land acquisitions costs, overall project costs for utility-scale arrays include site preparation (surveying, road building, leveling, grid and water connections etc.), foundations, tracker or fixed-tilt hardware, solar panels, inverters and electrical connections (conduit, wiring, trenching, grid interface, etc.). Many of these costs have come down over the past few years due to ongoing innovation and economies of scale, however, one area that has been largely ignored is foundations. Foundations provide a uniform structural interface that couples the system to the ground.

When installing a conventional single-axis tracker, after the site has been prepped, plumb monopiles are driven into the ground at regular intervals dictated by the tracker manufacturer and/or the site plan; the tracker system components are subsequently attached to the head of those piles. Most often, the piles have an H-shaped profile, but they may also be C-shaped or even box-shaped. In conventional, large-scale single-axis tracker arrays, the procurement and construction of the foundations may represent up to 5-10 percent of the total system cost. Despite this relatively small share, any savings in steel and labor associated with foundations will amount to a significant amount of money over a large portfolio of solar projects. Also, tracker development deals are often locked-in a year or more before the installation costs are actually incurred, so any post-deal foundation savings that can be realized will be on top of the profits already factored into calculations that supported the construction of the project.

One reason monopiles have dominated the market for single-axis tracker foundations is their simplicity. It is relatively easy to drive monopiles into the ground along a straight line with existing technology. Even though their design is inherently wasteful, their relatively low cost and predictable performance makes them an obvious choice over more expensive alternatives. The physics of a monopile mandates that it be oversized because single structural members are not good at resisting bending forces. When used to support a single-axis tracker, the largest forces on the foundation are not from the weight of the components, but rather the combined lateral force of wind striking the solar panels attached to the array. This lateral force gets translated into the monopile foundation as a bending moment. The magnitude of the moment is much greater than the static loading attributable to the weight of the panels and tracker components. Therefore, when used to support single-axis trackers, monopile foundations must be oversized and driven deeply into the ground to stand up to lateral loads.

There are alternatives to monopiles available in the marketplace but thus far they have not been cost competitive. For example, in very difficult soils where costly refusals dominate, some solar installers will use ground screws instead of H-piles. As the name implies, a ground screw is essentially a scaled-up version of a wood screw or self-taping metal screw, with an elongated, hollow shaft and a tapered end terminating in a blade or point. The screw also has a large, external thread form extending from the tip, up the taper and even partially up the shaft to enable it to engage with soil when screwed into the ground. Such a prior art ground screw is shown, for example, in FIG. 1A. Ground screws like the ground screw 10 in 1A are manufactured and sold by Krinner, GmbH of Strasskirchen, Germany, among others. When installers encounter rocky soils or must install over bedrock, they predrill holes at the location of each ground screw and then drive the screws into the pre-drilled holes, attaching above-ground foundation hardware to the head of each screw.

When used in foundations for single-axis trackers, grounds screws like that in FIG. 1A are typically installed in adjacent pairs. The pairs are joined above-ground with an upside-down T bracket that presents a monopile interface for the single-axis tracker. This is seen, for example, in system 20 in FIG. 1B. Ft. Meyers, Fla. based TERRASMART installs foundations like system 20 using Krinner ground screws. While this may mitigate the problem of refusals, it does not optimize material savings and will only pencil out where less expensive alternatives won't work. Vertical foundations that support single-axis trackers must resist bending, whether made from H-piles or ground screws. Referring to FIG. 2B, when wind strikes the array, it generates a lateral force labeled $F_L$ in the figure. The magnitude of this force is equal to $F_L$ multiplied by the height of the pile above the point where the foundation is pinned to the ground (e.g., does not move). This force puts plumb foundation components into bending. Because structural members are generally poor at resisting bending, they must be overbuilt to withstand it.

Another proposed alternative to percussion driven H-piles and vertical ground screws, uses a pair of ground screws driven at acute angles to each other in an A-frame configuration. Unlike plumb monopiles or the double-screw foundation of FIG. 1B, an A-frame has the advantage of converting lateral loads into axial forces of tension and compression in the legs. This is seen, for example, in published U.S. Patent Application, 2018/0051915 (hereinafter, "the '915 application"). FIG. 1C shows the system described in the '915 application. In theory, such as system enables the legs to be thinner than those used, for example, in the system of 1B, because the legs are not subjected to bending. FIG. 2C is a force diagram showing how lateral loads are translated in an A-frame such as that in 1C. Lateral load $F_L$ puts tension on the windward leg and compression on the leeward leg. System 30 is potentially an improvement over plumb piles and parallel ground screws, however, any system that uses standard ground screws is at a costs disadvantage relative to other structures. Moreover, the ground screw's closed geometry mandates a separate pre-drilling step where direct driving is not possible. Therefore, in their current form, and with conventional rotary driving and drilling equipment, it is not possible for ground screws to achieve cost parity with monopile foundations in anywhere other than in the worst soil conditions, and even in those conditions, there is room for significant improvement.

In recognition of these and other problems, it is an object of various embodiments of this disclosure to provide a truss or A-frame foundation for single-axis trackers and other applications that realizes the benefits of ground screws in a less costly, more robust, and flexible form factor, as well as machines and methods for installing such foundations.

BRIEF DESCRIPTION OF THE DRAWINGS

FIG. 4A shows a screw anchor according to various embodiments of the invention;
FIG. 4B is a close-up view of the threaded end of the screw anchor of FIG. 4A;
FIG. 4C shows a screw anchor according to various other embodiments of the invention.

DETAILED DESCRIPTION

Figure 1A:
FIG. 1A shows a conventional ground screw.

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

As discussed in the Background, ground screws are one alternative to conventional monopiles (e.g., H-piles, I-piles, post and cement, etc.). Ground screws are screw into underlying ground with a rotary driving using a combination of downward pressure and torque, much like driving a screw into wood. Usually, they are driven until they are completely or almost completely buried and then other hardware such as mounting brackets, braces, or supports may be attached to the portion remaining above-ground to support signs, decks, small building frames, and single-axis solar trackers among other structures.

Like any screw, the ground screw's pointed tip serves at least two functions: one, it allows the screw to be precisely oriented over the insertion point and provides a lead-in to help keep it on path and to pull the screw into the ground when driving. Second, the point and taper increase pressure around the threads as the screw penetrates, helping them to better grip the soil. The tip may also displace small rocks that could impede driving. All these benefits, however, are realized during driving. After the screw is in the ground, the tip serves little purpose and may be less effective than the remainder of the of the screw at resisting axial forces due to its tapered geometry. One reason why ground screws are seldom used in large-scale single-axis trackers is that they are relatively difficult and expensive to manufacture compared to H-piles and therefore cost more. A process for making a ground screw is shown, for example, in FIGS. 3A-D.

The process starts with cutting a length of rounded hollow pipe to a desired length. Then, one end of the pipe is inserted in an oven or electric heater and until it reaches a supercritical temperature. The hot end is then inserted into a shrinking machine that closes the tip imparts a taper and point. Once that cools, a strip of metal is formed around the pipe in a thread pattern and is welded to the pipe's surface. After it cools, the finished screw is galvanized to complete the manufacturing process. The two hot-forming steps require a large amount of input energy and the welded thread form is much more expensive than equivalent structure formed in a cold process. Also, the intermediate hot steps preclude the use of metal that has been pre-galvanized. Post manufacturing galvanization is much more expensive than starting with pre-galvanized metal.

To a large extent, the way that ground screws are installed and used requires that this expensive, multi-step manufacturing process. Screws need a tip to assist with driving and monopiles must be overbuilt to withstand bending forces that are orthogonal to the axis of the screw. The system shown in the '915 application overcomes the latter problem by translating the lateral load into axial forces of tension and compression, however, the magnitude of the tensile and compressive forces increases exponentially the steeper the legs are angled (e.g., the smaller the apex angle between the truss legs)—a fact not recognized in that '915 application. Therefore, even though the foundation shown in 1C may avoid bending, the large axial forces generated by the steep angles recommended will still require the ground screws to be overbuilt relative to A-frames oriented as less steep legs or with a larger apex angle. Moreover, because the system is built on ground screws, it still suffers from the inherent cost disadvantages discussed herein.

The inventors of this invention have proposed a foundation system, particularly well-suited for axial solar arrays (e.g., single axis trackers and fixed-tilt ground mounted arrays), that uses a pair of adjacent angled supports configured as a moderately angled A-frame (below 72.5 degrees) instead of a single vertical pile. The system is known commercially as EARTH TRUSS. FIG. 4A shows the base EARTH TRUSS component, screw anchor 200. Screw anchor 200 consists a section of elongated pipe having a substantially uniform diameter along its length that is open at both ends. These are important distinctions over conventional ground screws. The bottom or below-ground end of screw anchor 200 has an external thread form beginning proximate the lower end that increases in diameter as it extends up the pipe until it levels out to a uniform diameter for several more rotations. This is seen in greater detail in 4B, which shows only threaded portion 210 of anchor 200. As is discussed in greater detail herein, the significance of the tapered lead in may come in during driving as well as when doing in-situ refusal mitigation. The other end of exemplary anchor 200 in 4A has a connection portion 220, which in this example, is shown as a coupling. Connecting portion 220 has features that engage with the chuck of a rotary driver to enable screw anchor 200 to be driven. Connecting portion 220 also has at least one coupling feature to enable screw anchor 200 to be connected to other components that extend along substantially the same axis to make a two-piece leg.

It should be appreciated that in various embodiments, riving features may instead be stamped into the upper end of screw anchor 200 rather than part of a separate attached element. Moreover, a combination of camming and friction or other suitable mechanical technique may enable screw anchor 200 to be rotated into the ground without any driving features built into the upper end. In such embodiments, a separate connecting portion may be used or coupling elements may be built into other components above screw anchor 200.

FIG. 4C shows screw anchor 250 according to various other embodiment of the invention. Screw anchor 250 differs from screw anchor 200 in that the it has a slight taper to the tip rather than having a tapered lead in on the external thread form. Although this may be more expensive to manufacture than screw anchor 200, as long as the opening at the tapered end is sufficiently large, it may enjoy all of the other benefits of anchor 200 as discussed herein. Other embodiments may utilize both a slightly tapered tip and thread form with a tapered lead-in.

In various embodiments, a screw anchor such anchor 200 or anchor 250 will be rotated into the ground using a rotary driver or other like device. The rotary driver may rotate the screw anchor from the top or may be partially or fully inserted into the pile to rotate it partially from within. Because the various screw anchors disclosed herein are open at both ends, and as discussed in greater detail herein, it is possible, and may be desirable to insert another tool into the shaft of the pile from above during driving to clear a path ahead of the pile, to increase soil pressure around the thread form, and even to excavate a cavity in solid rock to receive the pile.

Figure 5A:
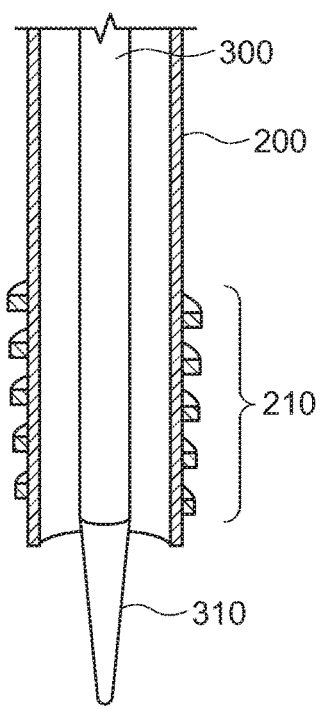
FIG. 5A is a cutaway view of a screw anchor and mandrel during driving according to various embodiments of the invention.
Figure 5B:
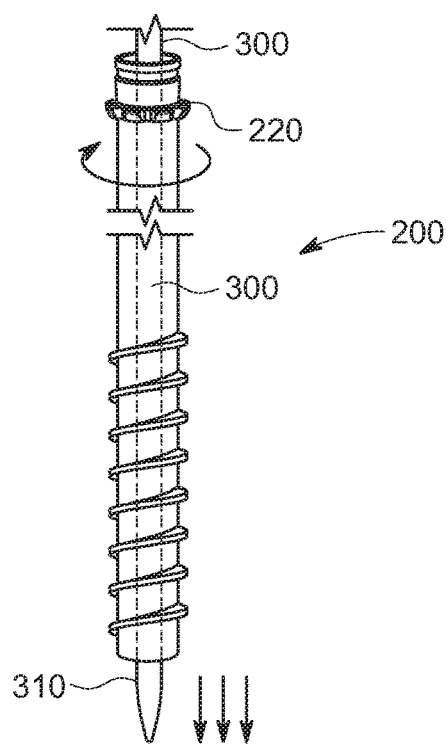
FIG. 5B shows a screw anchor being driven while a mandrel is simultaneously hammered through the center of the screw anchor.

Turning to FIGS. 5A and B, various embodiments of the invention take advantage of the open geometry of the screw anchor to insert tools into it during driving. In various embodiments, these tools may provide some of the benefits of a tip on a conventional ground screw and yet due to the hollow body, do not need to remain in the ground after the screw anchor is installed. To that end, FIG. 5A is a partial cutaway view showing a portion of exemplary screw anchor 200 with mandrel 300 extending through its center. Mandrel 300 is an elongated member, preferably of high strength steel and with a smaller outside diameter than the inside diameter of screw anchor 200. In various embodiments, mandrel 300 may have a detachable tip 310 that is profiled for the specific soil conditions present and to facilitate tip replacement without discarding the entire mandrel. Mandrel 300 may be actuated to apply downward pressure as screw anchor 200 is simultaneously rotated around it. Alternatively, mandrel 300 may apply a hammering force.

In various embodiments, the open geometry of screw anchor 200 makes it possible for tools such as a mandrel to be independently operated within anchor 200 and to be removed after driving is complete, leaving only those component required to resist axial forces in the ground. As seen in FIGS. 5A and B, during installation mandrel 300 may be inserted into the top end of screw anchor 200, slid all the way down its length until it reaches the opposing, below-ground end and actuated to push or hammer against the underlying ground. In various embodiments, and as discussed in greater detail herein, mandrel 300 may be connected to a separate driver that is aligned on an axis overlapping with an axis through the center of mass of screw anchor 200. Mandrel 300 may travel with screw anchor 200 as it is rotated in to prevent soil from plugging into the center of screw anchor 200. Alternatively, mandrel 300 may push downward ahead of the screw anchor to help clear a path and create soil tension around external thread form 210. This may be true whether the mandrel exerts stead downward pressure, is reciprocated, or is hammered into the underlying soil.

Reciprocating, hammering or simply pushing down with the mandrel may also allow it to displace and/or break up smaller rocks that are in the driving path. Without such action, rocks and other obstructions may cause a refusal and/or damage screw anchor 200. In the field of solar pile driving, a refusal occurs when additional driving force fails to result in further embedment. Usually, this indicates that the pile has struck a rock, cementious soil or, in the extreme case, solid bedrock. By reciprocating, hammering or pushing down with the mandrel, it functions as a chisel that can crumble small rocks, buried objects and pockets of dense or cementious soil. This is shown and discussed in greater detail, in the context of FIGS. 7A-D.

Figure 6A:
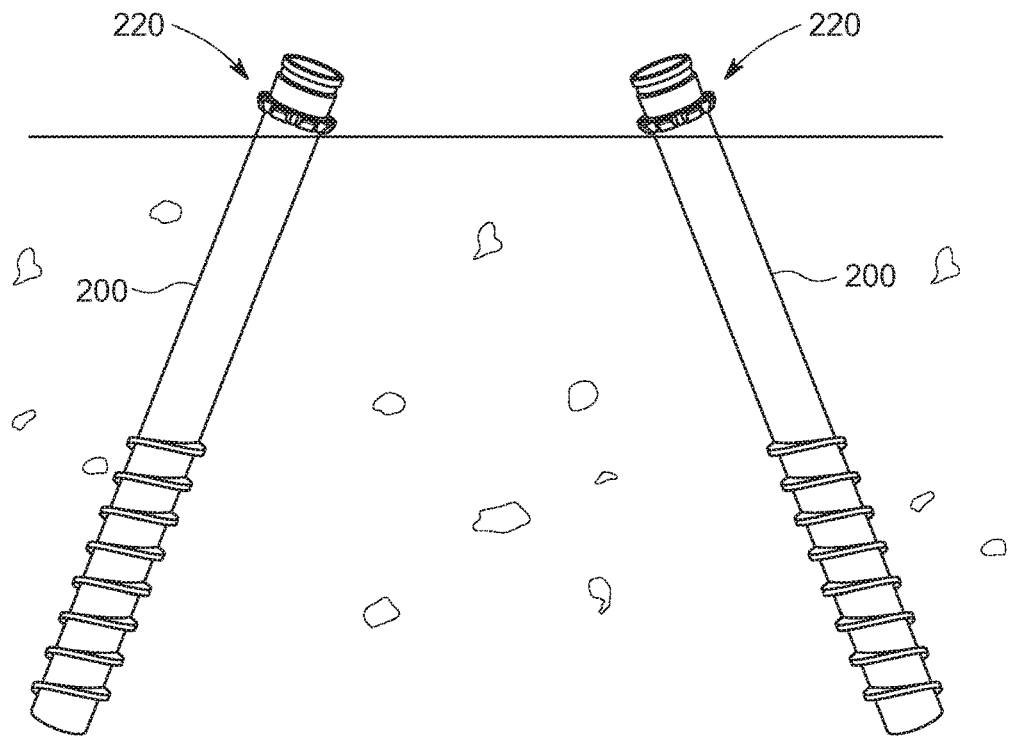
FIG. 6A shows a pair of adjacent screw anchors driven into underlying ground to form the base of a truss foundation according to various embodiments of the invention.
Figure 6B:
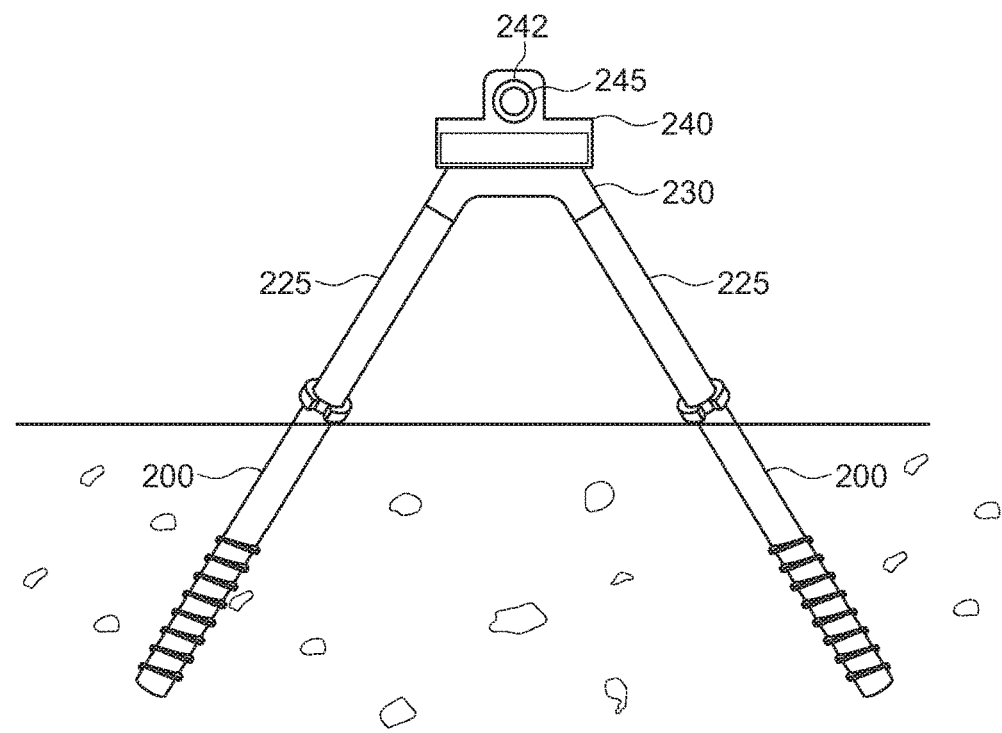
FIG. 6B shows a completed truss foundation supporting a portion of a single-axis tracker according to various embodiments of the invention.
Figure 7A:
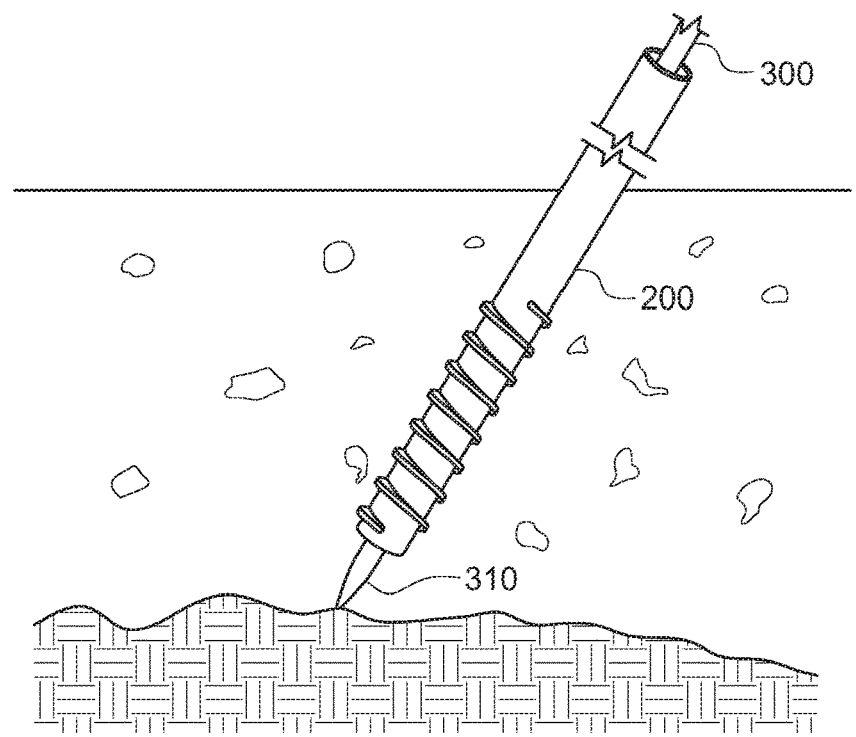
FIG. 7A shows a refusal of a screw anchor and mandrel while driving due to hitting bedrock according to various embodiments of the invention.
Figure 7B:
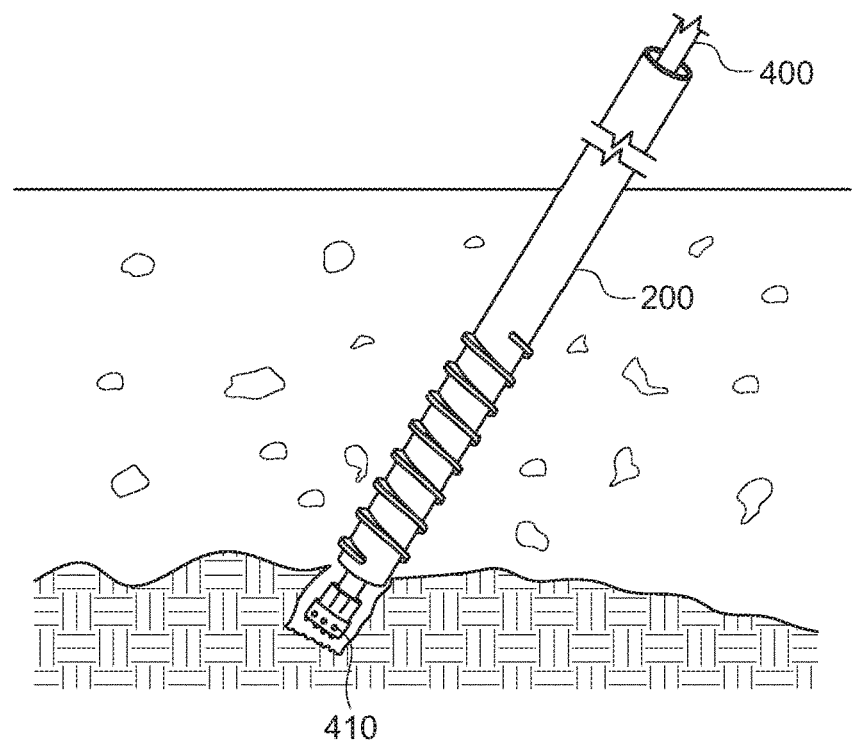
FIG. 7B shows an intermediate step of a process for in-situ refusal mitigation according to various embodiments of the invention.
Figure 7C:
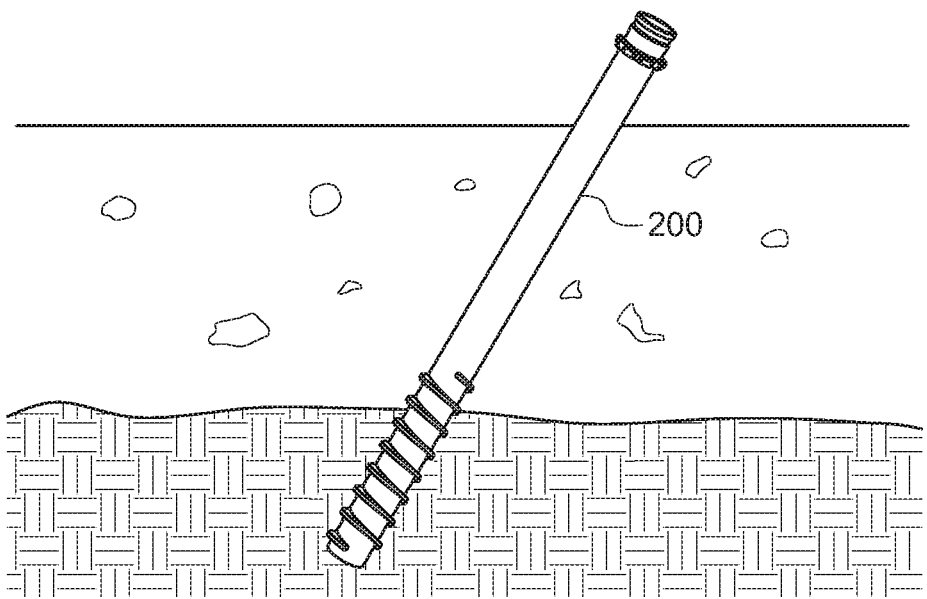
FIG. 7C shows the screw anchor of 7B after in-situ refusal mitigation according to various embodiments of the invention.
Figure 7D:
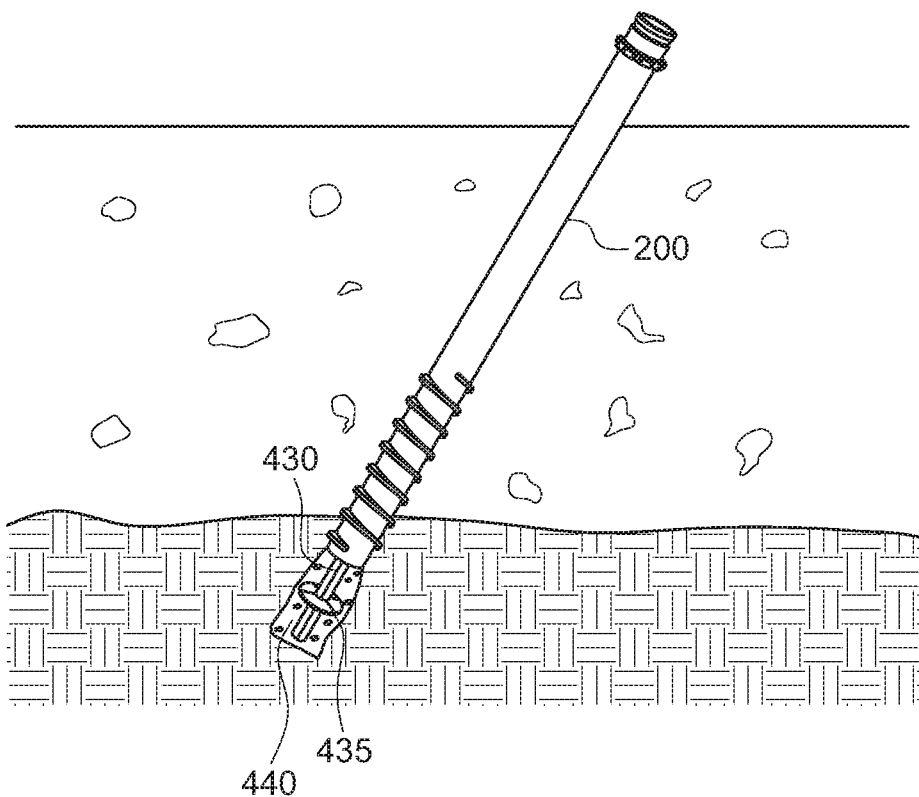
FIG. 7D shows the screw anchor of 7B after an alternative in-situ refusal mitigation technique according to various embodiments of the invention.

Turning to FIGS. 6A and B, these figures show two stages of installation of a pair of adjacent screw anchors and a truss foundation for a single-axis tracker using such screw anchors according to various exemplary embodiments of the invention. In 6A, screw anchors 200 have been driven into the ground adjacent one another and inclined inward at acute angles (e.g., less than 90-degrees). In various embodiments, and as shown here, they may be driven until almost entirely embedded, so that only the end portion remains above ground. As shown in FIGS. 5A and B, anchors 200 may be driven through the unique process described herein whereby screw anchor 200 is rotated into the underlying soil at the desired angle with a combination of torque and downward pressure by a rotary driver, while, at the same, time, a mandrel or other tool is actuated through the screw anchor to assist driving. Once both screw anchors 200 reach their respective target depths, above-ground components are attached.

In the example of 6A and B, upper legs 225 are inserted over connecting portions 220 to substantially extend the main axis of each screw anchor 200 toward the bearing housing. Free ends of each upper leg 225 are joined together to form a unitary A-framed-shaped truss by adapter 230. In various embodiments, and as shown here, adapter 230 may have a pair of symmetric connecting portions that extend down and away from the adapter to match the spacing and angle of upper legs 225. A bearing assembly, such as assembly 240 is attached to the top of adapter 230 and torque tube 245 rotatably captured within bearing 242.

Turning now to FIGS. 7A-D, these figures show various driving scenarios with a screw anchor and system for driving a screw anchor according to various exemplary embodiments of the invention. Starting with 7A, in this figure screw anchor 200 is driven into the supporting soil underlying the anchor. In various embodiments, and as discussed and shown herein, this is accomplished with a rotary driver or screw driving machine. At substantially the same time, mandrel 300 is actuated through screw anchor 200 to press down, hammer and/or reciprocate against the soil as anchor 200 travels along its path. In various embodiments, and as shown in the figure, mandrel tip 310 may project out of the below-ground end of screw anchor 200 as it is driven. In some embodiments, it may stay at substantially the same position relative to the lower end of anchor 200, traveling down with anchor 200 to displace soil and increase soil pressure around the anchor's threads. In other embodiments, mandrel tip 310 may exert downward pressure independent of the pile. If the rotary driver encounters excessive driving resistance as indicated, for example, by a reduction or stoppage in downward travel or excessive resistance against the rotary driver or both, mandrel 300 may be partially retracted so that tip 310 no longer projects out of the anchor to allow dirt to plug in the end, thereby relieving the soil pressure retarding driving. This reduction in pressure may reduce resistance to the rotary driver. It is important when screwing a pile or ground screw into the ground that the pile continues moving forward so that it doesn't auger or core the hole, which will reduce the pile's resistance to axial forces.

At some point while driving, mandrel tip 310 in 7A encounters solid bedrock resulting in a refusal. In various embodiments, a unique in-situ refusal mitigation process begins that was previously impossible in the prior art with conventional ground screw or with H-piles. The refusal condition may in various embodiments be detected by an operator or by an automated feedback loop sensing the failure of the mandrel or anchor to penetrate any further. In various embodiments, the operator will remove the mandrel from anchor 200 and replace it with a rock drill such as drill 400. In some embodiments, the rock drill may be a different attachment to the same driver actuating the mandrel. In other embodiments, the rock drill may be a different machine, requiring the mandrel driver to be pivoted or otherwise moved out of the way to make room for the rock drill. Once out, mandrel 300 is replaced with a drill shaft 400 and rock drill bit 410. These components are inserted into the top end of anchor 200 and passed through it until reaching the bedrock below. In various embodiment, the same driver used to actuate the mandrel is used to actuate the rock drill. The rock drill may consist of a down-the-hole hammer and bit that uses compressed air to hammer the bit inside of anchor 200. Alternatively, the rock drill may be a top hammer whereby hammering action is applied to shaft 400 and this force is directly translated to rock bit 410.

As is known in the art, rock drills typically use pressurized air to generate the hammering action and to blow the crushed rock spoils out of the way. The specific action of the rock drill (e.g., hammering, rotating) will in part be dictated by the type of drill bit used. For example, a button bit typically employs hammering action alone whereas other types of bits may rely on a combination of hammering and rotary cutting.

In various embodiments the rock drill will continue its action until a cavity has been formed in the rock having the desired depth. This depth may be the minimum depth required to secure the screw anchor or the original target depth. In either case, once the cavity is crated, the rock drill is removed, or least partially withdrawn from anchor 200 so as not to project below it and the rotary driver is engaged to drive the anchor into the newly formed cavity. In various embodiments, the tapered lead-in on the threads will increase the likelihood that the application of torque and downward pressure on anchor 200 will guide it into the cavity. In some embodiments, screw anchor 200 may be driven all the way to the bottom of the cavity, such as shown in 7C. This will depend on the size of the bore relative to the outside diameter of the anchor, how clean and free of spoils the cavity is, and the geometry and dimensions of the thread form. In other embodiments, anchor 200 may not be able to be fully driven to the bottom of the cavity. This may be a consequence of the blind underground conditions (e.g., cleanliness of the borehole, density of soil above the borehole) or the dimensions of drill bit 410 or threads. In either case, it may only be possible to drive a portion of anchor 200 into the cavity. In some cases, driving anchor 200 as deeply as possible may provide sufficient engagement between the anchor threads and the wall of the cavity without additional steps. This could, in various embodiments, be confirmed by pulling up on anchor 200 with the rotary driver or another tool with a fixed force. In other cases, if sufficient engagement between the threads and the wall of the cavity is not achieved, additional steps may be required.

To that end, drill shaft 400 and bit 410 may be withdrawn from driven anchor 200 and a coupler or other device such as coupler 430 may be dropped down anchor 200 until it reaches the bottom of the cavity. In various embodiments, coupler 430 may be a piece of rebar or other rigid material that is small enough to fit within anchor 200 but long enough to extend from the bottom of the cavity into anchor 200. The purpose of coupler 430 is to connect anchor 200 to the underlying rock. One or more centralizers 435 or other like devices may be used to maintain coupler 430's orientation within the center of anchor 200 as well as in the cavity. After coupler 430 is placed, a volume of pressurized grout, epoxy or other suitable material 440 may be injected via the above-ground end of anchor 200, filling the cavity completely and surrounding coupler 430 and the portion of anchor 200 containing the coupler. Once material 440 sets, anchor 200 will be firmly coupled to the bedrock.

Figure 8:
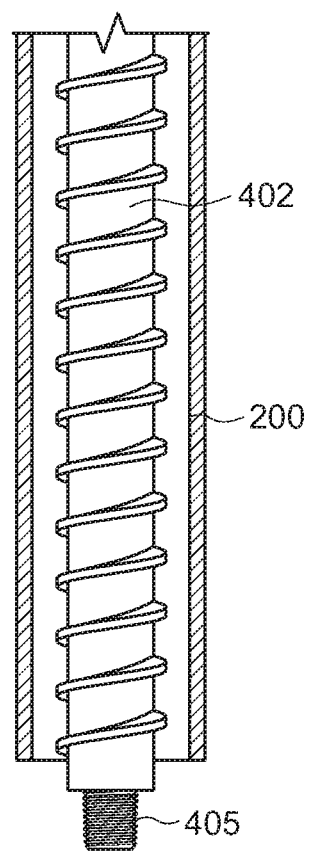
FIG. 8 is a partial cutaway viewing showing an augured drill shaft according to various embodiments of the invention.

FIG. 8 shows an augered drill shaft usable with various embodiments of the invention. Depending on the type of bit used and whether a top hammer or bottom hammer is used, it may be necessary and/or desirable to use mechanical energy to remove spoils generated by the drill from the shaft of anchor 200. To that end, drill shaft 402 includes a series of helical threads circumscribing some, most or all of its length. These threads will tend to move material up and out of the inside of anchor 200 when the shaft is rotated in the correct direction (clockwise in the exemplary shaft 402 shown in the Figure). Also shown is male threaded portion 405 at the base of shaft 402 for attaching different drill bits. It should be appreciated that threaded portion 405 is exemplary only and meant merely to signify that tips may be removed from shaft 405 without needing to discard the entire shaft. In other embodiments, a female opening, a pin connection, conical threads, or other known fastening mechanisms or their functional equivalents may be used instead.

Figure 9A:
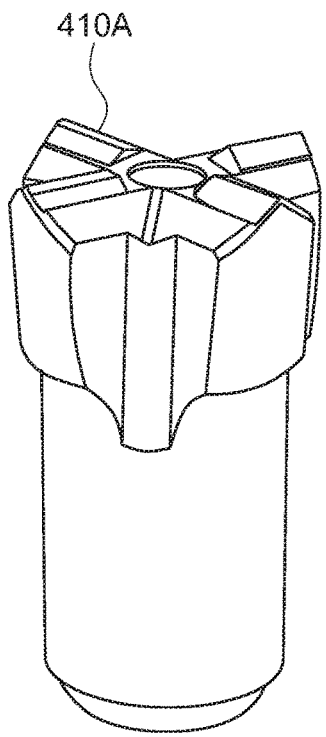
FIGS. 9A-C shows various rock drill bits usable to perform in-situ refusal mitigation according to various embodiments of the invention.
Figure 9B:
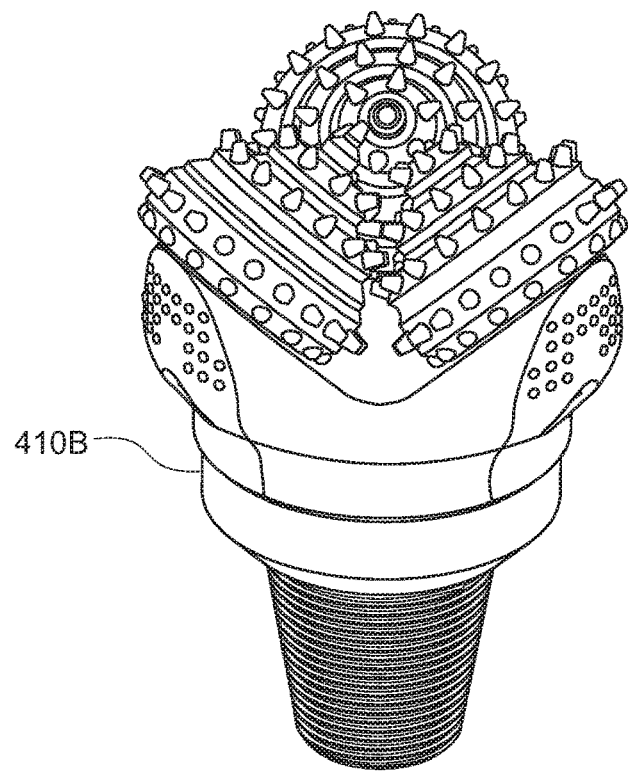
Figure 9C:
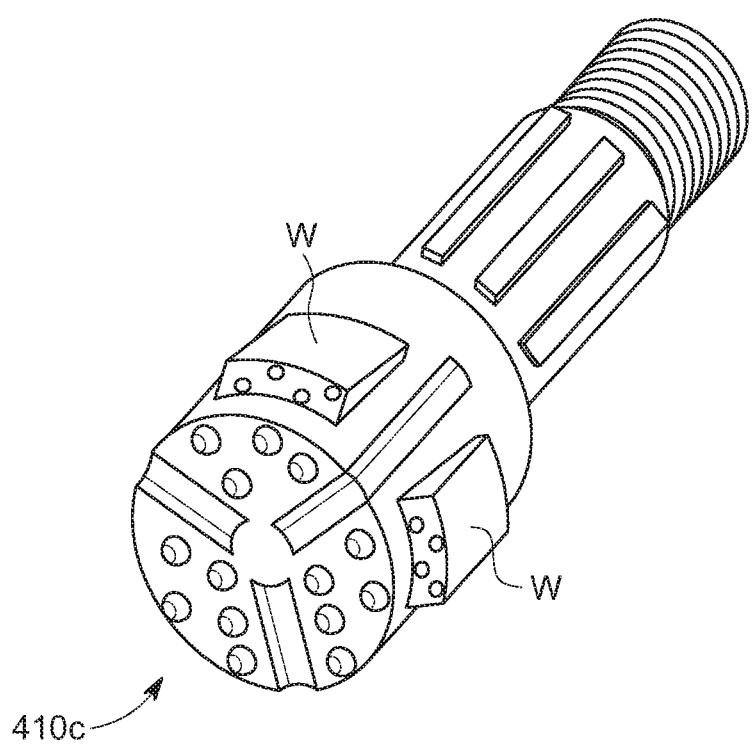

Turning now to FIGS. 9A-C, these figures show several different drill bits that may be used with various embodiments of the invention. The first bit, bit 410A is a cross bit or cross rock bit. It consists of four raised chisel-type blades oriented in a cross pattern. This type of bit is typically made of steel with the blades coated with titanium or made from hardened steel or carbide. The bit may be hammered and rotated to chisel and scrape through rock while the spoils are evacuated via the space between the four blades. FIG. 9B shows tri-cone roller bit 410B. The tri-cone roller bit has three rotating cone-shaped wheels covered in steel or carbide cutting teeth that are attached to a stationary head via a bearing connection. As the drill is rotated, these cones roll along the bottom of the bore hole in a circular pattern chipping away at the underlying rock. Downward pressure on the bit facilitates the cutting. Such bits are commonly used in water, gas and oil exploration and extraction. Spoils are drawn up an annulus in the center of the bit with compressed air or fluid. The last bit shown in 9C is percussion-type hammer bit 410C. Hammer bits are not sharp and do not use cutting as their primary boring mechanism. Rather, a series of hardened carbide buttons are embedded in the face of the bit. During rotation, a shank beats against an anvil or strike surface inside the bit head causing the buttons to pulverize any rock they come into contact with while rotation and compressed air sweeps the debris out of the way and into debris channels so that the next impact will again strike virgin rock. Any of the bits shown in FIGS. 9A-C, or any other commercially available or as of yet undeveloped bits may be used with the various embodiments of the invention.

In certain situations where drilling is required, it may be desirable to drill a cavity that has a slightly larger outside diameter than the base pile. For example, to create a cavity that is wide enough to at least partially accept the threaded end 210 of screw anchor 200. To that end, bit 410C in FIG. 9C is one type of bit capable of drilling a larger diameter hole than the casing it is inserted in. This technique is often employed in drill-and-case applications where the diameter of the bore needs to be larger than the diameter of the casing to allow spoils to be ejected around the outer diameter of the pipe among other reasons. Bit 410C accomplishes this with one or more deployable wings, labeled "W" in the figure, that expand the cutting diameter of the bit once the bit is free of the anchor. When bit 410C is initially inserted into the end screw anchor 200, the one or more wings are recessed to be flush with the outside surface of the bit. This can be done mechanically or by an operator compressing them as the bit is inserted into the anchor. When the bit emerges from the other end, and the wings are no longer compressed by the inner surface of the anchor, so they expand to their relaxed position, either under spring action or via another deployment mechanism, thereby increasing the cutting diameter of the bit. In various embodiments, additional carbide buttons may be formed on the cutting surface of the wings (e.g., the surface that is normal to the direction of drilling). In various embodiments, if the wings are spring loaded, the resistance from the rock will tend to keep them out, that is, at the expanded orientation. Once the desired depth has been achieved and the bit and shaft are drawn back into the bottom end of the anchor, pressure against the back of the one or more wings from the anchor opening will push them back to the recessed position, reducing the outside diameter of the bit, allowing it to be drawn up and out of the anchor. It should be appreciated that there are various other bits available for undercut drilling, including ones that are intentionally offset so that once they begin to rotate they sweep around a larger diameter circle.

Figure 13:
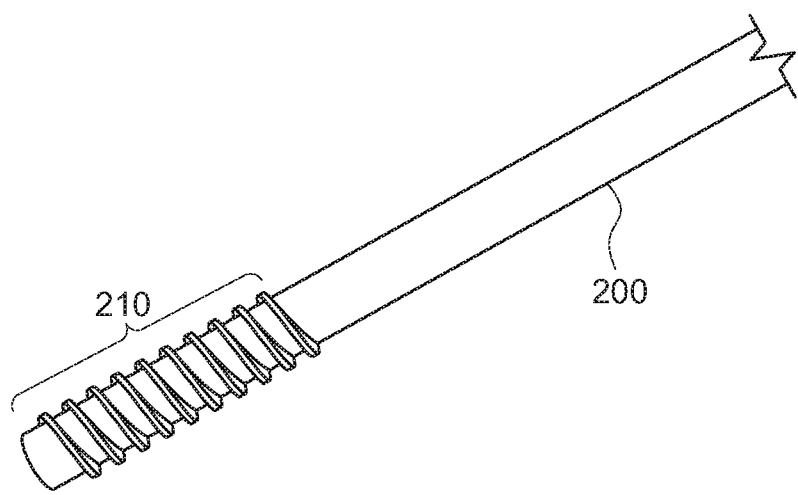
FIG. 13 is a portion of a screw anchor according to various embodiments of the invention.
Figure 14A:
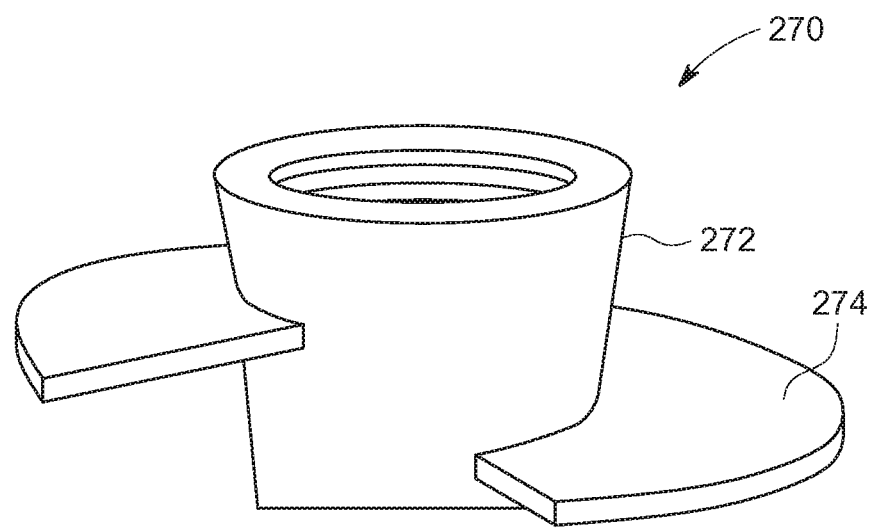
FIGS. 14A-C are various views of a helical nut usable with a screw anchor according to various embodiments of the invention.
Figure 14B:
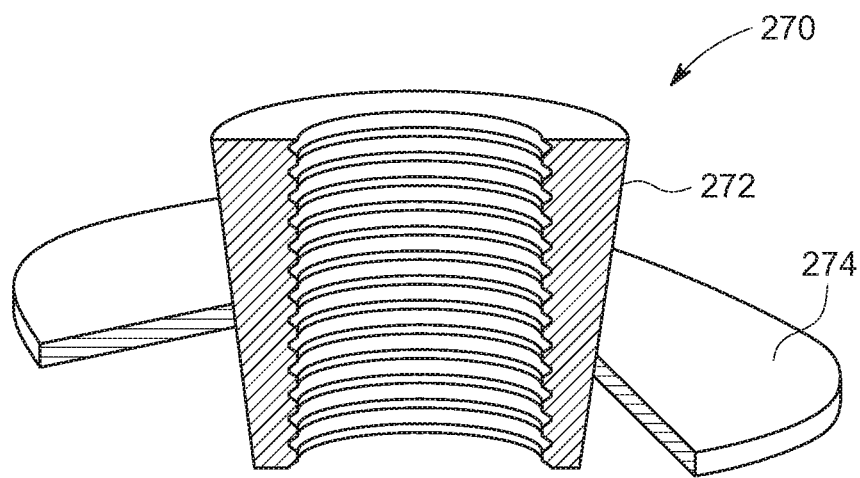
Figure 14C:
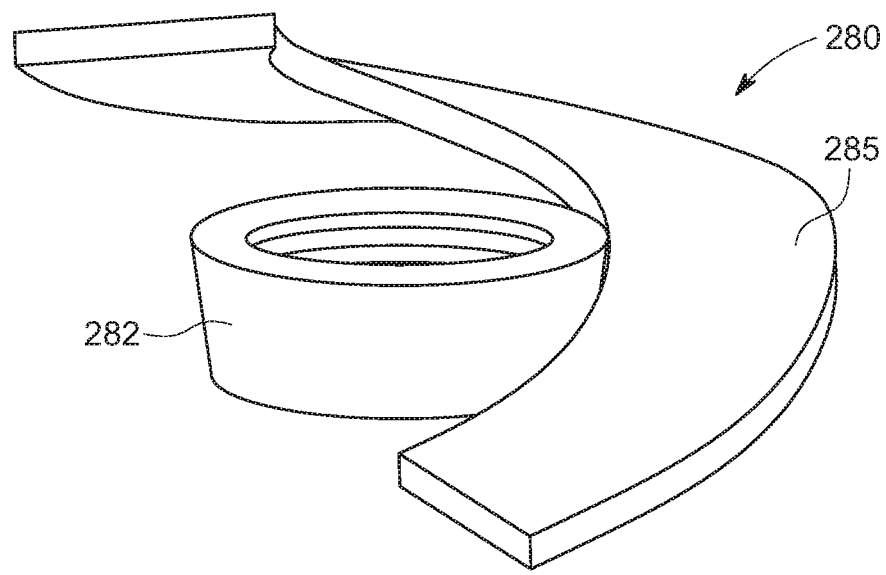

Contrary to the cementious and/or rocky soils that lead to refusals, some soils may be so loosely structured that they provide very little resistance to driving, but at the same time, lack the ability to resist axial forces of tension and compressions. In such soils, threaded screw anchor 200 alone may need more orthogonal surface area to provide the required resistance. To that end, FIGS. 14A-C show a helical nut according to various embodiments of the invention that may be usable with a screw anchor such as screw anchor 200 in FIG. 13 to increase the anchors ability to resist axial forces in such soils. Starting with 14A and B, these figures show helical nut 270 according to various exemplary embodiments. As shown, helical nut 270 consists of main body portion 272 and helix 274. As seen in the cutaway view of 14B, the inside of main body portion 272 is threaded. In various embodiments, the depth and pitch of these threads will match the pitch and depth of external threads 210 on anchor 200. This will enable helical nut 270 to be spun onto anchor 200 until the tapered lead-in of the thread form projects further than the female thread depth in helical nut 270. When anchor 200 is driven into underlying ground with helical nut 270 attached, clockwise rotation of the anchor will reinforce rather than loosen the connection between nut 270 and threaded portion 210. The outside diameter of helix 274 can substantially increase the amount of orthogonal surface area, creating a column or cone of resistance to pull-out and making it very difficult to further compress anchor 200 after it's driven.

FIG. 14C shows another embodiment of a helical nut usable with a screw anchor according to various exemplary embodiments of the invention. Nut 280 of 14C consist of threaded retaining nut 282 and separate helix 280. In various embodiments, helix 280 has a pitch that matches the pitch of the threads on threaded portion 210 and a center opening slightly larger than the outside diameter of anchor 200 so that helix 280 can be threaded up anchor 200 to a desired location. Then, threaded retaining nut 282, which preferably has threads substantially matching those of helical nut 272, that is, threads that are the same pitch and depth of threaded portion 210 so that retaining nut 282 can also be threaded onto threaded portion 210 to press helix 285 against the external threads at the desired location and to capture it there. Driving the resulting helical screw anchor may be performed in the same manner as described herein.

Up to this point, the disclosure has focused on screw anchors and techniques for driving the screw anchor. The remainder of this disclosure will focus on exemplary machines and methods of operating machines to drive screw anchors into supporting ground while actuating a mandrel or rock drill through the screw anchor according to various embodiments of the invention. It should be appreciated that machines shown in these figures are exemplary only and should be considered in terms of their functionality with respect to driving screw anchors rather than their physical attributes as shown in the drawings. Different physical embodiments are possible while retaining the spirit and scope of the various embodiments of the invention.

Figure 1B:
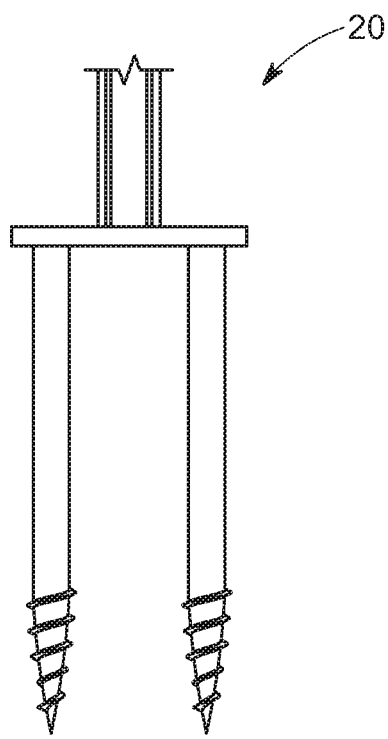
FIG. 1B shows a conventional double ground screw foundation for single-axis trackers.
Figure 1C:
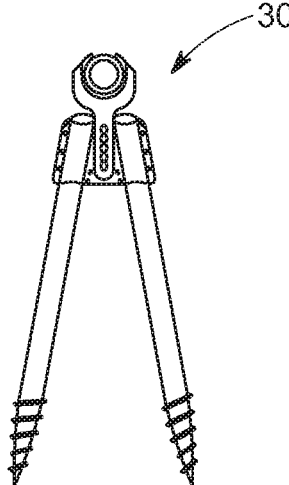
FIG. 1C shows a steeply sloped A-frame foundation for single-axis trackers using a pair of conventional ground screws.
Figure 2A:
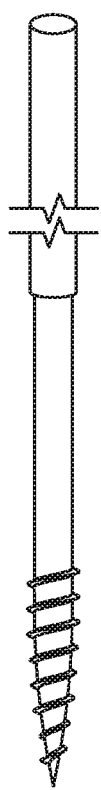
FIG. 2A is a ground screw supporting a monopile foundation.
Figure 2B:
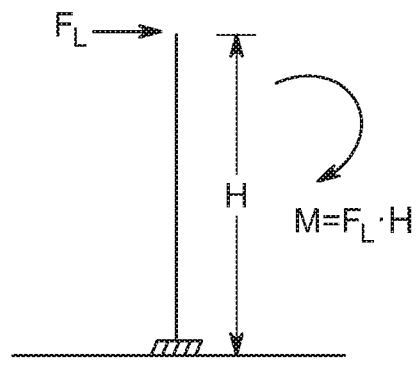
FIG. 2B is a force diagram showing how lateral loads are translated in a monopile foundation.
Figure 2C:
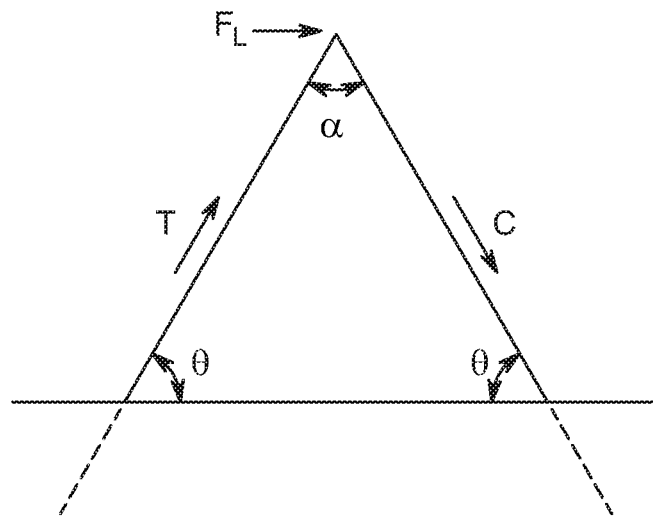
FIG. 2C is a force diagram showing how lateral loads are translated in an A-frame foundation.
Figure 3A:
FIGS. 3A-D show the manufacturing steps for a tapered ground screw.
Figure 3B:
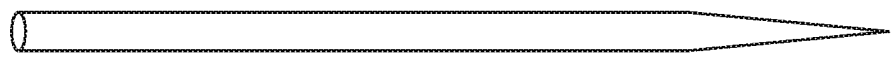
Figure 3C:
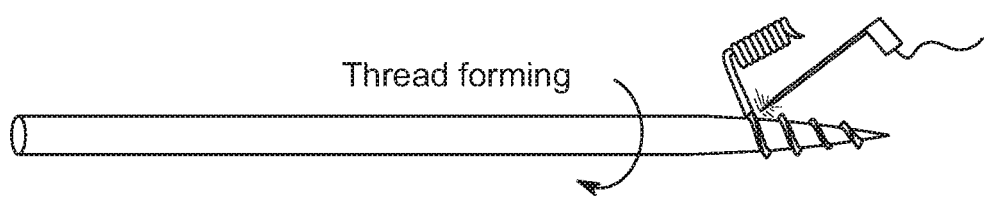
Figure 3D:
Figure 10A:
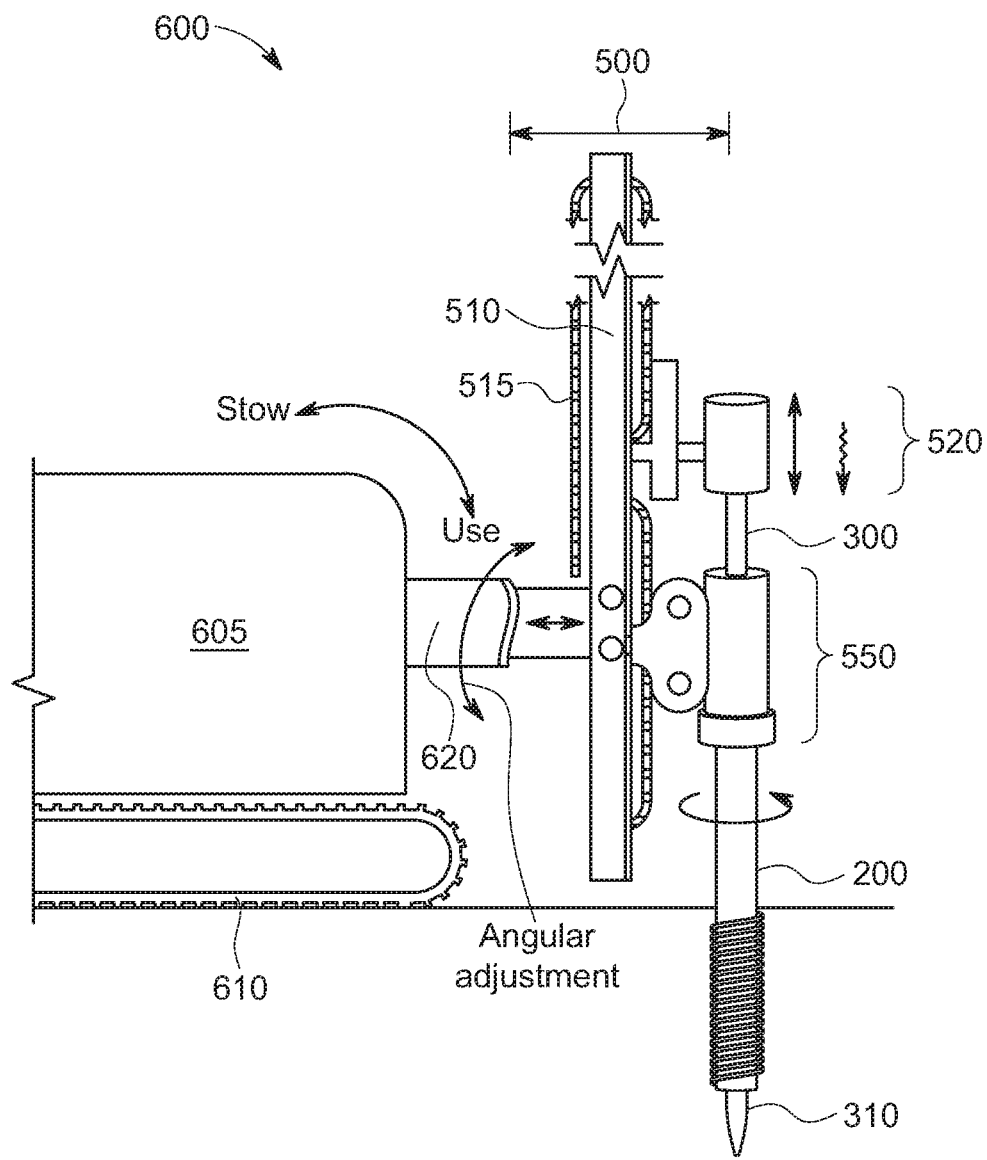
FIGS. 10A and B are side and front view of a piece of heavy equipment with an attachment for installing screw anchors according to various embodiments of the invention.

Turning to FIGS. 10A and 1B, these figures show side and front views respectively of exemplary machine 600 for driving screw anchors according to various embodiments of the invention. As shown, machine 600 includes a main body 605 riding on a tracked chassis 610. It should be appreciated that machine 600 could instead have tires, a combination of tires and tracks, one or more floating pontoons, rails or other known means. As shown, machine 600 has an attachment, attachment 500, mounted to the end of articulating arm 620. In various embodiments, articulating arm 620 is part of the base machine and can move through an arc of approximately 90 degrees from a stowed position where the arm is substantially perpendicular to the ground to an in-use position where the arm is substantially parallel to the ground. In various embodiments, the end of articulating arm 620 is also able to rotate through a range of angles about its axis (e.g., ±35-degrees from vertical) so that screw anchors may be driven into the ground at non-plumb angles. This also decouples the screw anchor driving axis from the orientation of the machine by allowing it to compensate for uneven terrain in at least the East-West direction. Alternatively, a rotator may be located at the end of arm 620 so that the entire arm does not have to rotate in order to rotate attachment 500. In various embodiments, the end of articulating arm 620 supports driving attachment 500 with a main axis that may be substantially perpendicular to articulating arm 620. Therefore, when arm 620 is in the stowed position, attachment 500 will be substantially parallel to the ground, minimizing its height, whereas when arm 620 is in the in-use position, driving attachment 500 will be substantially perpendicular to the ground.

As shown in the example of FIGS. 10A/10B, attachment 500 includes frame 510 that functions as a scaffold to support rotary or screw driver 550 and mandrel driver 520, and that provides a common axis for them to move along. In various embodiments, frame 510 includes a pair of parallel side members 510A/B that are interconnected by cross members. This configuration is exemplary only. Various trussed and/or reinforced supports, beams and cross members may be used to provide the requisite rigidity and strength. Frame 510 may also include one or more tracks that the mandrel driver and rotary driver travel on to limit their movement to axial movement only. The one or more tracks may be located between parallel side member 510A/B, or, alternatively, as shown in the figures, may be attached to the side members 510A/B. In still further alternatives, mandrel driver 520 and rotary driver 550 may travel on wheels inside recesses formed in parallel side members 510A/B. The specific mechanism used to limit movement to a single axis along attachment 500 is a design choice.

In various embodiments, one or more linked drive chains and corresponding motor assemblies may be used to move mandrel driver 520 and rotary driver 550 along the one or more tracks. In various embodiments, they may move independent of one another. In other embodiments, they may move together. In still further embodiments, both modes may be possible. For example, when driving, rotary driver 550 will apply torque while a motor driving chain 515 will generate downforce that is translated to the anchor via rotary driver 550. Therefore, from the perspective of the screw anchor the rotary driver is applying torque and axial force even the source of the axial force may be a motor driving the chain. Similarly, mandrel driver 520 may applying a hammering action to mandrel 300 however, axial downforce may also come from the motor driving chain 515, which in turn, pull mandrel driver 520 downwards. This force, however, is translated through the mandrel driver to the mandrel so from the perspective of the mandrel both of these axial forces (hammering and downward pressure) are coming from the mandrel driver.

In various embodiments, rotary driver 550 may be powered by electric current or by hydraulic actuation in a manner known in the art. Similarly, mandrel driver 520 may be powered by compressed air, electric current or by hydraulic actuation. Mandrel driver 520 may be a hydraulic drifter or other suitable device for generating downforce and/or hammering force. In various embodiments, and as shown in the figures, mandrel driver 520 and rotary driver 550 may be oriented concentrically on the frame in the direction of the one or more tracks so that the shaft of mandrel 300 can pass through rotary driver 550 and move up and down within driver 550 while it is rotating a screw anchor into the ground. In this manner, tip 310 of mandrel 300 may operate ahead of screw anchor 200, projecting out of its bottom (below-ground) opening, to clear a path for and ahead of screw anchor 200. This may also allow mandrel 300 to be dropped down through rotary driver once it is decoupled from driver 520 for repair and/or replacement without completely disassembling attachment 500.

Figure 10B:
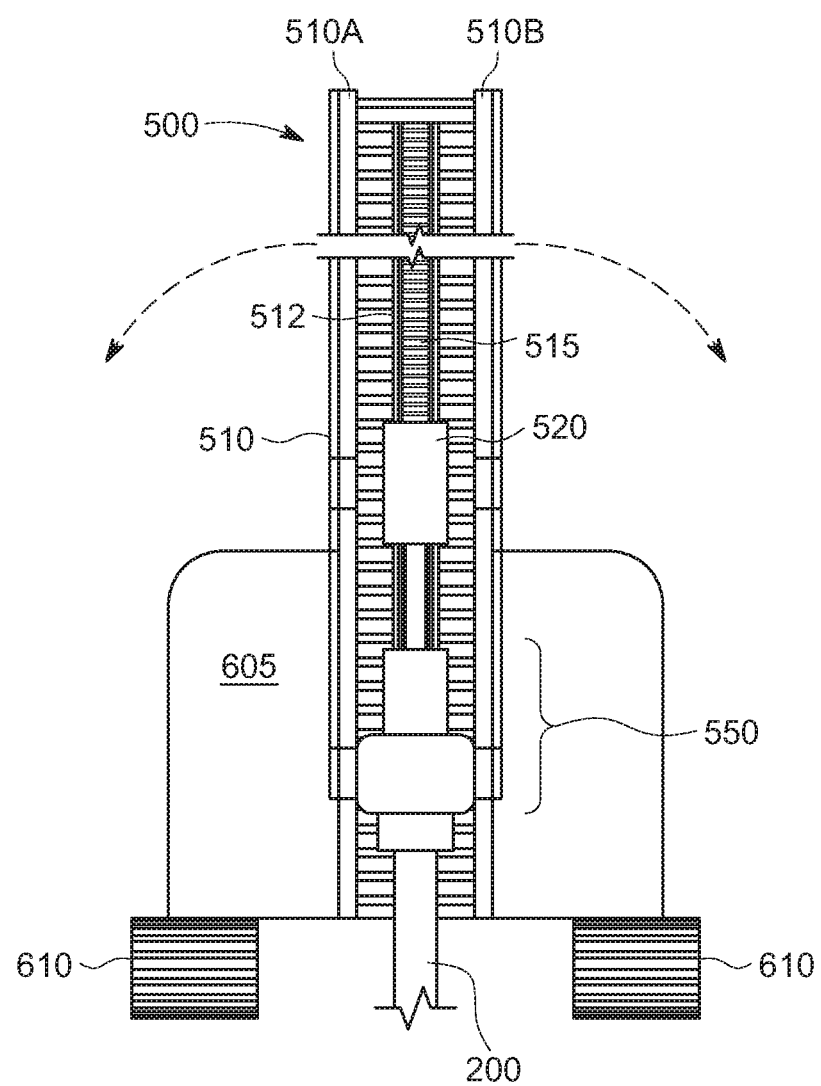

With continued reference to FIGS. 10A and 10B, exemplary machine 600 has a main body portion 605 housing the machine's petrol engine or electric motor, a fuel tank or power cell, a hydraulic system, counterweights if necessary, and a control interface, sitting on tracked chassis 610. Machine 600 may also have an air compressor and air lines for supplying pressurized air to an air hammer or other equipment, a power take-off for mechanically transferring power to external devices, an electrical connection for providing electric power to attachment 500, and one or more hydraulic interfaces for communicating hydraulic fluid to attachment 500, mandrel driver 520, and/or rotary driver 550. In the example of FIGS. 10A/B, articulating arm 620 projects away from one end of the machine (e.g., front or rear), functioning as an attachment support. In other embodiments, it may project from either side. In still further embodiments, arm 620 may be mounted on a rotatable turret that can rotate completely around a vertical axis over tracked chassis 610 to any radial orientation. Dotted lines in FIG. 10B on either side of attachment 500 show how it can rotate about a rotation point to drive screw anchors into the ground at angles.

Figure 11:
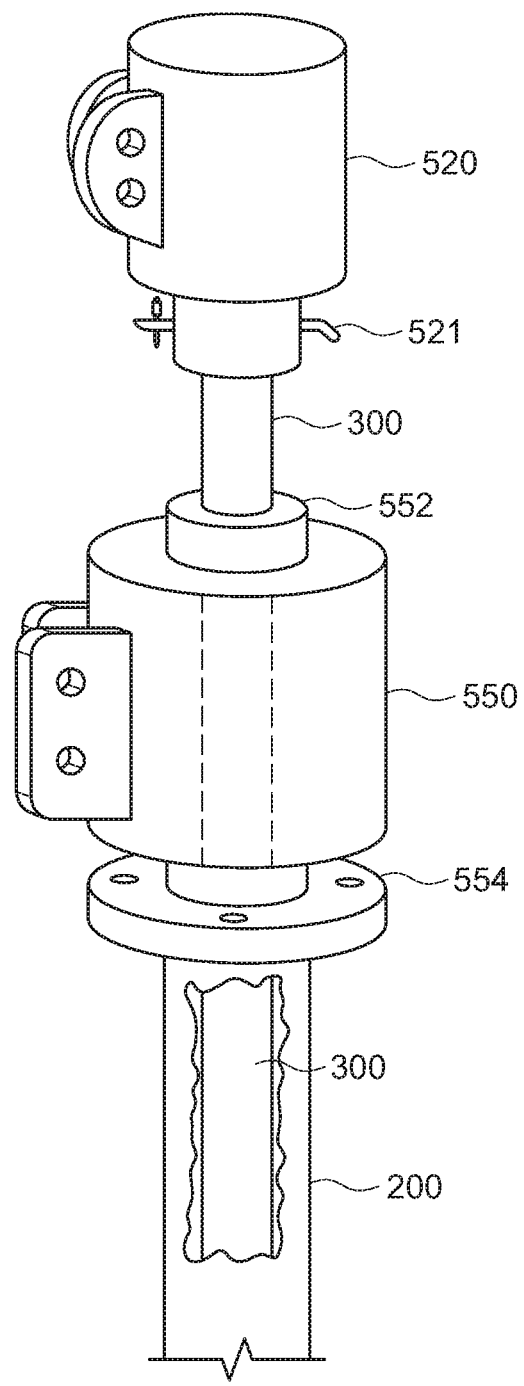
FIG. 11 is a view of a portion of an attachment for driving a screw anchor with a rotary driver and mandrel according to various embodiments of the invention.

FIG. 11 is a close-up view of mandrel driver 520 and rotary driver 550. For ease of illustration, the attachment and machine have been intentionally omitted. In the exemplary configuration shown here, mandrel 300 is attached to mandrel driver 520 via pin connection 521. As noted herein, in various embodiments, this may enable simplified removal of the mandrel 300 by removing the pin and allowing mandrel 300 to drop through rotary driver 550 under the force of gravity. In various embodiments, one or more bearings such as bearing 552 are located above and below rotary driver 550 to limit the motion of the mandrel 300 and prevent it from damaging rotary driver 550. Rotary driver 550 may have a rotating head such as head 555, chuck, or other device for transferring torque and downward pressure to screw anchor 200. The partial cutaway at the bottom of FIG. 11 shows that the fitment of mandrel 300 within screw anchor 200. In this exemplary figure, movement of rotary driver 550 and mandrel driver 520 are facilitated via a chain and drive motor moving the chain. In various embodiments, rotary driver 550 is fixed to chain 515, while mandrel driver 520 is attached but able to be decoupled from chain 515 for independent movement or to stay in place. It should be appreciated that instead of a chain two or more hydraulic actuators may be used to push and pull rotary driver 550 along its axis of travel and to make mandrel driver 520 travel with it or independent of it. The specific manner in which downforce is generated and the way that rotary driver 550 and mandrel driver 520 travel along their axis is a design choice.

Figure 12:
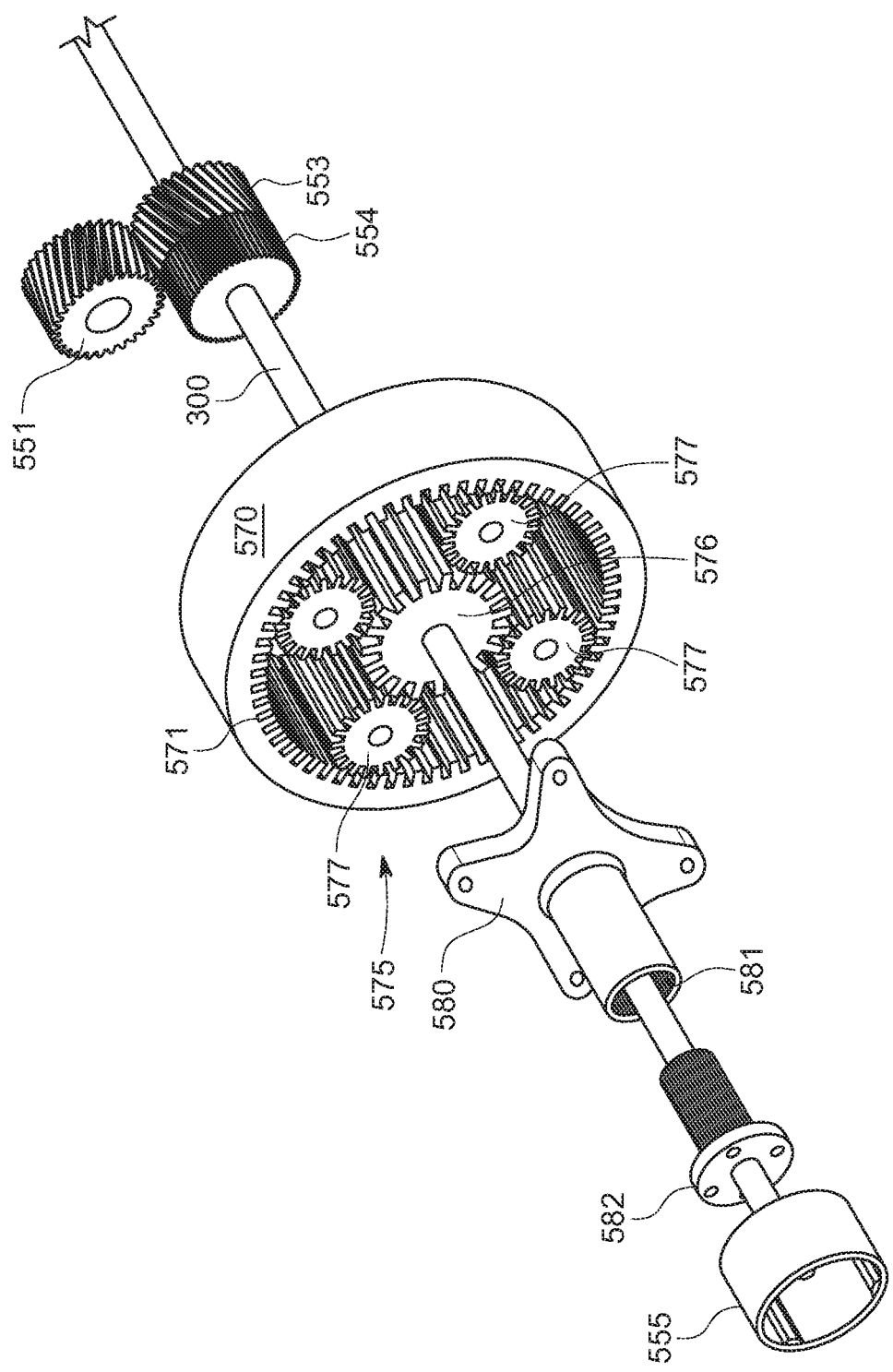
FIG. 12 is an exploded view of an assembly for actuating a mandrel through a rotary driver and screw anchor according to various embodiments of the invention.

As discussed herein, the ability to actuate tools through the screw anchor while driving is a major advantage relative to conventional ground screws. This is possible because both ends of the screw anchor are open. Having the ends open is accomplished with fewer rather than more manufacturing steps, allowing a less expensive and energy intensive manufacturing process. The tools can mimic the functionality and benefits of the ground screw tip, all of which are realized during driving, while providing better pull out and compressive resistance per unit of length because the tip is removed after driving. To accomplish this, depending on how torque is imparted to the screw anchor, it may be necessary for the mandrel to pass directly through the rotary driver. FIG. 12 shows one assembly for accomplishing this, however, it should be appreciated that there are many possible ways of doing so.

FIG. 12 is a partial exploded view of a drive train and gear assembly stack that allows mandrel 300 to actuate within rotary driver 550 without affecting its operation according to various embodiments of the invention. As shown, at its top end, output gear 551 is mechanically coupled to the output shaft of an electric or hydraulic motor. It may be directly coupled to the output or coupled via a transmission or other reduction gear assembly (not shown) to provide greater mechanical advantage. Output gear 551 is synchronized to two-part drive gear 552 consisting of driven portion 553 and driving portion 554. In various embodiments, driving portion 554 is splined to interface with splines in sun gear 576 that is the center of planetary gear assembly 575. Planetary gear assembly 575 consists of ring gear 571 on the inside of housing 570 that retains planetary gears 577 orbiting sun gear 576. As drive gear 551 rotates driven portion 553 of the drive gear, driving portion 554 rotates sun gear 576 in place. Sun gear 576 drives planetary gears 577, in this case, four planetary gears, to rotate within ring gear 571. Planetary carrier 580 is attached to the center of each planetary gear 577 with a bearing to generate output power for the rotary driver. Planetary carrier 580 includes splined hub 581 that mates with splined driving head 582. A chuck or drive plate such as drive plate 554 in FIG. 11 or driving chuck 555 in FIG. 12 is connected to splined driving head 582 to transfer torque to the head of a screw anchor. Though now shown, one or more bearing collars may be positioned at the point where mandrel 300 enters and exists housing 570 of rotary driver 550 to limit its motion to the axial motion without affecting the rotary driver's motion.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A screw anchor driving assembly comprising:
   a mast;
   a rotary driver operable to travel along the mast and to impart torque and downforce to construct a foundation by embedding a screw anchor into underlying ground, wherein embedding comprises screwing the screw anchor into the ground with a combination of torque and downforce so that external threads on the screw anchor engage the ground substantially without augering it;
   a screw anchor attached to an output of the rotary driver;
   a tool driver on the mast operable to travel along the mast above the rotary driver; and
   a tool rod attached to the tool driver and extending through the rotary driver and the screw anchor, wherein the tool driver is operable to independently impart torque and axial force to the tool rod through the screw anchor while the rotary driver embeds the screw anchor into underlying ground, and to withdrawal the tool rod leaving the screw anchor embedded in the underlying ground.

2. The assembly according to claim 1, wherein the screw anchor has at least one driving feature at the second end for engaging with the output of the rotary driver.

3. The assembly according to claim 1, wherein the mast is rotatably attached to a piece of heavy equipment.

4. The assembly according to claim 3, wherein the mast is operable to rotate relative to the piece of heavy equipment to a first angle to drive a first screw anchor into supporting ground, to rotate to a second angle, and to drive a second screw anchor into supporting ground at the second angle without moving the machine, wherein the first and second screw anchors form part of a single truss foundation.

5. The assembly according to claim 1, further comprising a rock drill bit at one end of the tool rod, wherein the tool driver is operable to drill a cavity in subsurface rock through the screw anchor with the rock drill bit.

6. The assembly according to claim 1, wherein the tool driver is a hydraulic drifter.

7. An assembly for a screw anchor driving attachment for constructing screw anchor foundations with heavy equipment comprising:
- a screw anchor driver operable to construct a foundation by embedding a screw anchor into underlying ground, wherein embedding comprises screwing the anchor into the ground with a combination of torque and downforce so that external threads on the anchor engage the ground to increase the anchor's resistance to pull-out;
- a screw anchor attached to an output of the screw anchor driver;
- a tool driver positioned above the screw anchor driver; and
- a tool rod coupled to the tool driver, wherein the tool driver is operable to independently actuate the tool rod through the screw anchor while the screw anchor driver embeds the screw anchor into underlying ground.

8. The assembly according to claim 7, further comprising a rock drill bit attached to an end of the tool rod, wherein the tool driver is operable to drill through and ahead of a screw anchor while the screw anchor driver embeds the screw anchor into underlying ground.

9. The assembly according to claim 7, wherein the driving attachment comprises a mast, and the screw anchor driver and tool driver are attached to and operable to travel along the mast.

10. The assembly according to claim 9, further comprising a separate motor on the mast that is operable to pull down on the screw anchor driver to transfer downforce to the screw anchor through the screw anchor driver.

11. The assembly according to claim 9, wherein the mast is rotatably coupled to a piece of heavy equipment.

12. The assembly according to claim 7, wherein the tool driver is a hydraulic drifter operable to apply torque and a hammering force to the tool rod.

13. A method of embedding a screw anchor for a foundation comprising:
- embedding a threaded screw anchor into underlying soil with a screw driver, wherein embedding comprises applying a combination of torque and downforce to a head of the threaded screw anchor so that the threads engage the soil substantially without augering;
- at substantially the same time, actuating a tool driver to drive a tool into the underlying soil through the screw driver and the threaded screw anchor to assist embedment; and
- withdrawing the mandrel and screw driver while leaving the embedded screw anchor in place.

14. The method of claim 13, wherein actuating the tool driver comprises applying an axial hammering force to the tool with the tool driver.

15. The method according to claim 13, wherein if continued application of torque and downforce to the screw anchor fails to result in further embedment:
- removing the tool from the screw anchor while leaving the partially driven screw anchor in-situ;
- attaching a rock drill bit to the tool;
- inserting the tool and drill bit through the partially driven screw anchor;
- actuating the tool driver to drill a cavity below the screw anchor with the drill bit; and
- embedding the screw anchor into the cavity.

16. The method according to claim 15, wherein embedding the screw anchor into the cavity further comprises:
- inserting a coupling into the cavity through the open screw anchor so that it extends from the cavity into the screw anchor and injecting pressurized fluid around the coupling, wherein the pressurized fluid is selected from the group consisting of grout, cement, resin, and epoxy.

* * * * *